United States Patent
Isobe

(10) Patent No.: US 7,988,278 B2
(45) Date of Patent: *Aug. 2, 2011

(54) INKJET INK AND PRINTING METHOD USING THE SAME

(75) Inventor: Kozo Isobe, Osaka (JP)

(73) Assignee: General Company Limited, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/654,773

(22) Filed: Dec. 31, 2009

(65) Prior Publication Data

US 2010/0110121 A1    May 6, 2010

Related U.S. Application Data

(62) Division of application No. 11/631,346, filed on Jul. 17, 2007, now Pat. No. 7,922,315.

(30) Foreign Application Priority Data

Jul. 1, 2004 (JP) ................... 2004-195934

(51) Int. Cl.
    *C09D 11/00* (2006.01)
(52) U.S. Cl. ................... 347/100; 106/31.13
(58) Field of Classification Search .......... 347/100; 106/31.13
    See application file for complete search history.

(56) References Cited

U.S. PATENT DOCUMENTS

| | | | | |
|---|---|---|---|---|
| 5,563,644 | A * | 10/1996 | Isganitis et al. | 347/102 |
| 6,281,267 | B2 | 8/2001 | Parazak | |
| 6,613,136 | B1 | 9/2003 | Arita et al. | 106/31.58 |
| 2002/0041318 | A1 * | 4/2002 | Osumi et al. | 347/100 |
| 2003/0079652 | A1 | 5/2003 | Choy | |
| 2003/0084817 | A1 * | 5/2003 | Sarkisian et al. | 106/31.58 |
| 2003/0112305 | A1 | 6/2003 | Kato et al. | 347/100 |
| 2003/0150355 | A1 | 8/2003 | Choy et al. | |
| 2004/0061752 | A1 | 4/2004 | Alfekri et al. | 347/99 |
| 2004/0061753 | A1 | 4/2004 | Chen et al. | |
| 2004/0061755 | A1 | 4/2004 | Chen et al. | |
| 2004/0070654 | A1 | 4/2004 | Taguchi et al. | |
| 2004/0092623 | A1 | 5/2004 | Hesler et al. | |
| 2005/0282930 | A1 | 12/2005 | Fu et al. | |
| 2007/0070165 | A1 | 3/2007 | Yoneda et al. | |

FOREIGN PATENT DOCUMENTS

| | | |
|---|---|---|
| EP | 1148103 | 10/2001 |
| EP | 1193301 A1 | 4/2002 |
| EP | 1308491 | 5/2003 |
| JP | 02255774 A | 10/1990 |
| JP | 2001-254037 | 9/2001 |
| JP | 2002-179968 | 6/2002 |
| JP | 2002-226726 | 8/2002 |
| JP | 2003-064286 | 3/2003 |
| JP | 2003-206426 | 7/2003 |
| JP | 2003-268279 | 9/2003 |
| JP | 2004-114692 | 4/2004 |
| JP | 2004-510028 | 4/2004 |
| JP | 2004-176057 | 6/2004 |
| JP | 2006-022328 | 1/2006 |
| WO | WO-02/26901 | 4/2002 |
| WO | WO-2005044588 A1 | 5/2005 |

* cited by examiner

*Primary Examiner* — Laura E Martin
(74) *Attorney, Agent, or Firm* — Rabin & Berdo, P.C.

(57) ABSTRACT

An inkjet ink and a method for printing on hydrophobic media such as offset coated media, using the inkjet ink, including an inkjet containing a pigment, water, a surfactant and 40 to 75 weight % of a polar non-protic solvent with a molecular weight of 40 to 130 which has permeability to a hydrophobic surface such as the coating of an offset coated medium.

4 Claims, No Drawings

INKJET INK AND PRINTING METHOD USING THE SAME

CROSS-REFERENCE TO RELATED APPLICATION

This application is a second division of copending application Ser. No. 11/631,346, filed Jul. 17, 2007, which is a U.S. national stage application of PCT application serial number PCT/JP2005/021206, filed Jun. 30, 2005.

TECHNICAL FIELD

The present invention relates in particular to an inkjet ink suitable for printing on hydrophobic media, such as offset coated media, and a method for printing on hydrophobic media using the inkjet ink.

BACKGROUND ART

Generally with a conventional inkjet printing method using an aqueous inkjet ink, printing is performed on a bond paper or other normal type of paper or on a specialized paper, typically designed to have a high ink absorbing property, etc. However, offset coated media that are suitable for offset printing are not suited for printing using an aqueous inkjet ink, because a substrate surface is coated with a smooth, hydrophobic, and non-porous coating.

Even if printing using an aqueous inkjet ink is performed, because the coating does not absorb the aqueous inkjet ink, the inkjet ink is repelled by or bleeds on the coating surface and a clear print with sharp edges cannot be obtained. Further, because the print is poor in drying property and inadequate in fixing property even upon drying, bleeding occurs readily when the print is rubbed. Development of a new art for performing printing satisfactorily on offset coated media by an inkjet printing method is thus being demanded.

For performing printing satisfactorily on offset coated media by an inkjet printing method, improvement of the affinity of an inkjet ink to a hydrophobic coating is considered first, and for this purpose, surfactant types have been examined and blending of glycol ether or a wetting agent, etc., that exhibits compatibility with water and yet exhibits affinity with the hydrophobic coating has been proposed. For improvement of the fixing property as well as improvement of the affinity of the printed inkjet ink on the coating, blending of a water-soluble or water-dispersible binder resin (vehicle) has also been proposed (see, for example, Patent Documents 1 and 2, indicated below).

Combined use of water and a solvent, having compatibility with water and exhibiting permeability to a hydrophobic coating, is also considered, and the use of a polar aprotic solvent as such a solvent has been proposed (Patent Document 3).
Patent Document 1: Japanese Unexamined Patent Publication No. 2003-206426 (Claims and Paragraphs 0009 to 0010)
Patent Document 2: Japanese Unexamined Patent Publication No. 2004-510028 (Claims and Paragraph 0012)
Patent Document 3: Japanese Unexamined Patent Publication No. 2003-268279 (Claims and Paragraph 0009)

DISCLOSURE OF THE INVENTION

Problems to be Solved by the Invention

With just examining surfactants, glycol ether, wetting agents, binder resins, etc., that are known components in aqueous inkjet inks as described in Patent Documents 1 and 2, the effects are limited and it is difficult to perform better printing on a surface of an offset coated medium than at present.

On the other hand, since the polar aprotic solvent described in Patent Document 3 exhibits good permeability to coatings that are normally used in offset coated media, obtainment of clear prints with sharp edges by prevention of repulsion and bleeding of the inkjet ink on a coating surface, and improvement of the drying property of the printed inkjet ink by absorption of the polar aprotic solvent in the coating, etc., are thus anticipated. However, with the arrangement of the inkjet ink described in Patent Document 3, despite the inclusion of the polar aprotic solvent, the effects thereof are still inadequate and further improvement is desired.

An object of the present invention is to provide an aqueous inkjet ink that enables even better printing on hydrophobic media, such as offset coated media, than conventional inks, and a method for printing on hydrophobic media using the inkjet ink.

Means for Solving the Problem

The present invention relates to an inkjet ink for printing on hydrophobic media including: a pigment; water; a surfactant; and a polar aprotic solvent having a molecular weight of 40 to 130, wherein the content proportion of the polar aprotic solvent is 40 to 75 weight %.

The polar aprotic solvent preferably has a boiling point of 150 to 250° C. The polar aprotic solvent is preferably at least one type of solvent selected from the group consisting of 1,3-dimethyl-2-imidazolidinone, N-methyl-2-pyrrolidone, 2-pyrrolidone, formamide, N-methylformamide, N,N-dimethylformamide, N,N-diethylpropionamide, and γ-butyrolactone.

As the surfactant, a surfactant having a dynamic contact angle at 23° C. of no more than 20° is preferable. Also, as the surfactant, a silicone-based surfactant is preferable, and a blending ratio (weight ratio) P/S of the polar aprotic solvent P and the silicone-based surfactant S is preferably P/S=45/1 to 70/1.

An inkjet ink according to the present invention includes: a pigment; water; and polar aprotic solvent having a molecular weight of 40 to 130, wherein the content proportion of the polar aprotic solvent is 40 to 75 weight %, as the surfactant, a silicone-based surfactant $S_1$ expressed by the Formula (1):

[Chemical Formula 1]

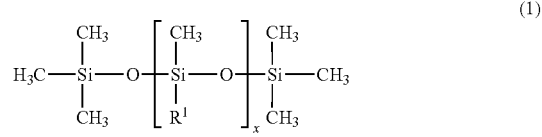

(1)

[where $R^1$ indicates a polyalkylene oxide chain containing at least one or more ethylene oxide groups or propylene oxide groups, and x indicates a numeral of no less than 1] and a silicone-based surfactant $S_2$ expressed by the Formula (2):

[Chemical Formula 2]

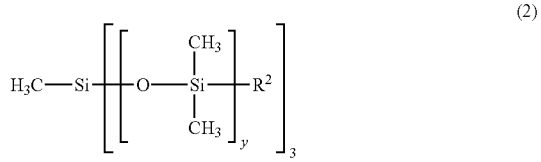

[where $R^2$ indicates a polyalkylene oxide chain containing at least one or more ethylene oxide groups or propylene oxide groups, and y indicates a numeral of no less than 1] are preferably used in combination, and a blending ratio (weight ratio) $S_1/S_2$ of the two silicone-based surfactants is $S_1/S_2=6/4$ to 4/6. Further, a blending ratio (weight ratio) $P/(S_1+S_2)$ of the polar aprotic solvent P and the two silicone-based surfactants $S_1+S_2$ is preferably $P/(S_1+S_2)=45/1$ to 70/1.

An inkjet ink for printing on hydrophobic media comprising: a pigment; water; surfactant; and polar aprotic solvent having a molecular weight of 40 to 130, wherein the content proportion of the polar aprotic solvent is 40 to 75 weight %, and the surfactant is a fluorine-based surfactant expressed by the Formula (3):

[Chemical Formula 3]

$$C_mF_{2m+1}COONH_4 \quad (3)$$

[where m indicates a numeral of no less than 1].

Also, a blending ratio (weight ratio) P/F of the polar aprotic solvent P and the fluorine-based surfactant F is preferably P/F=45/1 to 100/1. Further, preferably, the pigment surface is modified by carboxylic groups.

A printing method according to the present invention includes the steps of: using the inkjet ink of the present invention to print on a hydrophobic medium; and heating the hydrophobic medium after printing.

Effects of the Invention

In the inkjet ink described in Patent Document 3, an aprotic polar solvent is contained at a content proportion of 5 to 40 weight % with respect to the total amount of the inkjet ink. Examination by the present inventor has shown that within this content proportion range, the effect of increasing permeability into a coating or other hydrophobic surface of an offset coated medium to improve the drying property, etc., of a print cannot be adequately obtained.

Although in order to increase the permeability into a coating, etc., a larger amount of a polar aprotic solvent must be contained, when a polar aprotic solvent that is high in molecular weight is contained at a proportion of no less than 40 weight % with respect to the total amount of the inkjet ink, the viscosity of the inkjet ink increases and this may cause degradation of discharge stability during discharge from fine nozzles of a head of an inkjet printer.

In contrast, in the present invention, because among the polar aprotic solvents described in Patent Document 3, a polar aprotic solvent having a low molecular weight of no more than 130 is used selectively and the content proportion thereof is limited to no less than 40 weight %, the permeability with respect to a hydrophobic surface can be increased to improve the drying property of a print, etc., over the conventional case while suppressing the increase of viscosity of the inkjet ink to maintain good discharge stability. Thus, according to the inkjet ink of the present invention, better printing than at present can be performed on hydrophobic media such as offset coated media.

In the present invention, the molecular weight of the polar aprotic solvent is limited to no less than 40 because when a low molecular weight polar aprotic solvent with a molecular weight less than 40 is used, the inkjet ink dries readily and tends to readily cause clogging of the above-described fine nozzles, etc. The content proportion of the polar aprotic solvent is limited to no more than 75 weight % because when the content proportion exceeds 75 weight %, even if the molecular weight of the polar aprotic solvent is limited to no more than 130, the viscosity of the inkjet ink becomes high and degrades the discharge stability during discharge from the fine nozzles.

In the present invention, the polar aprotic solvent preferably has a boiling point of 150 to 250° C. When the boiling point of the polar aprotic solvent is less than 150° C., the inkjet ink dries readily and tends to readily cause clogging of the nozzles, etc. When the boiling point exceeds 250° C., the inkjet ink conversely causes difficulty in drying and the drying property after printing may degrade. In contrast, when the boiling point of the polar aprotic solvent is 150 to 250° C., the above problems can be prevented and even better printing can be performed on hydrophobic media.

As a favorable polar aprotic solvent that meets these conditions, at least one type of solvent selected from the group consisting of 1,3-dimethyl-2-imidazolidinone, N-methyl-2-pyrrolidone, 2-pyrrolidone, formamide, N-methylformamide, N,N-dimethylformamide, N,N-diethylpropionamide, and γ-butyrolactone can be cited. When any of these polar aprotic solvents is used, not only the various effects mentioned above can be provided but, although the details are not clear, the dispersion stability of the pigment in the inkjet ink can also be improved.

As the surfactant, a surfactant having a dynamic contact angle at 23° C. of no more than 20° is preferably used. When a surfactant having a dynamic contact angle at 23° C. that exceeds 20° is used, the inkjet ink is heated even the inkjet ink does not wet hydrophobic surfaces adequately and thus a clear print with sharp edges may not be obtained.

Meanwhile, when a surfactant having a dynamic contact angle at 23° C. of no more than 20° is used, because the inkjet ink wets hydrophobic surfaces rapidly before heating, a clear print with sharp edges can be obtained.

As the surfactant having a dynamic contact angle at 23° C. of no more than 20°, a silicone-based surfactant excellent in the effect of lowering the surface tension of the inkjet ink and improving the wetting property of the inkjet ink with respect to hydrophobic surfaces with no possibility of environmental impact is used favorably in comparison to PFOS (perfluorooctane sulfonate) based surfactants excellent in the same effects.

The blending ratio (weight ratio) P/S of the polar aprotic solvent P and the silicone-based surfactant S having a dynamic contact angle at 23° C. of no more than 20° is preferably P/S=45/1 to 70/1. When the amount of the silicone-based surfactant falls below this range, because the silicone-based surfactant is excellent in compatibility with the polar aprotic solvent, the surfactant function of the silicone-based surfactant becomes obscured and the effect of improving the wetting property of the inkjet ink with respect to hydrophobic surfaces may become inadequate.

When the amount of the silicone-based surfactant exceeds the above range, the wetting property of the inkjet ink with respect to hydrophobic surfaces becomes too good, thereby causing the inkjet ink to bleed before heating, and a clear print with sharp edges may not be obtained. Further, because a part of the excessive silicone-based surfactant may become released and hydrolyzed to produce a silicone monomer that is insoluble in water. This silicone monomer may undergo phase separation from the inkjet ink and lower the uniformity of the inkjet ink, the discharge stability during discharge from the above-described fine nozzles may degrade.

In contrast, when the blending ratio (weight ratio) P/S of the polar aprotic solvent P and the silicone-based surfactant S is set so that P/S=45/1 to 70/1, the above problems can be prevented so as to enable even better printing on hydrophobic media.

As the surfactant, a silicone-based surfactant $S_1$ expressed by the above Formula (1) and a silicone-based surfactant $S_2$ expressed by the Formula (2) are also preferably used in combination. When these two types of silicone-based surfactants are used in combination, good printing can be performed with even higher stability on hydrophobic media of various surface states of a wide range, from glossy offset coated media with a 60° glossiness, as measured, for example, by micro-Tri-gloss, manufactured by BYK-Gardner GmbH, of no less than 70°, to matted offset coated media, for which the above-described 60° glossiness is no more than 20°. Moreover, as with the above-described surfactants, these two types of silicone-based surfactants provide a merit of no possibility to impact the environment in comparison to the PFOS-based surfactants.

Although the silicone-based surfactant $S_1$ expressed by the Formula (1) exhibits an extremely high wetting property with respect to offset coated media and other hydrophobic media, so that good printing can be performed on glossy offset coated media that readily repels aqueous inkjet inks. However, since the wetting property is too high, the print may bleed on matted offset coated media due to the effects of the fine unevenness of the surface.

Meanwhile, using the silicone-based surfactant $S_1$ expressed by the Formula (1) in combination with the silicone-based surfactant $S_2$ expressed by the Formula (2), which is more suppressed in wetting property than that of $S_1$, bleeding on the surfaces of matted offset coated media is prevented so that good printing can be performed on the matted offset coated media as well.

In the combined system, the blending ratio (weight ratio) $S_1/S_2$ of the two silicone-based surfactants is preferably set $S_1/S_2$=6/4 to 4/6. When the amount of the silicone-based surfactant $S_1$ expressed by the Formula (1) falls below this range, because the effect of improving the wetting property of the inkjet ink by the silicone-based surfactant $S_1$ becomes inadequate, the inkjet ink may be readily repelled, especially in printing on a glossy offset coated medium.

In contrast, when the amount of the silicone-based surfactant $S_2$ expressed by the Formula (2) falls below the above range, because the effect of suppressing the wetting property of the inkjet ink by the silicone-based surfactant $S_2$ becomes inadequate, bleeding may occur readily, especially in printing on a matted offset coated medium.

Meanwhile, when the blending ratio (weight ratio) $S_1/S_2$ of the two silicone-based surfactants is set $S_1/S_2$=6/4 to 4/6, due to the synergistic effect of combined use of the two silicone-based surfactants, printing can be performed with even higher stability on hydrophobic media of various surface states of a wide range, from glossy offset coated media to matted offset coated media, as described above.

By the same reasons as those given above for the silicone-based surfactant having a dynamic contact angle at 23° C. of no more than 20°, the blending ratio (weight ratio) $P/(S_1+S_2)$ of the polar aprotic solvent P and the two silicone-based surfactants $S_1$ and $S_2$ is preferably $P/(S_1+S_2)$=45/1 to 70/1.

As the surfactant, a fluorine-based surfactant expressed by the Formula (3) can also be used preferably. When the fluorine-based surfactant expressed by the Formula (3) is used, printing can be performed with even higher stability on the above-described hydrophobic media of various surface states of a wide range, from glossy offset coated media with which the above-described 60° glossiness is no less than 70° to matted offset coated media with which the above-described 60° glossiness is no more than 20°. Moreover, as with the above-described silicone-based surfactants, the fluorine-based surfactant expressed by the Formula (3) provides the merit that there is no possibility of impacting the environment in comparison to the PFOS-based surfactants.

A blending ratio (weight ratio) P/F of the polar aprotic solvent P and the fluorine-based surfactant F is preferably set P/F=45/1 to 100/1. When the amount of the fluorine-based surfactant falls below this range, because the effect of improving the wetting property of the inkjet ink by the fluorine-based surfactant becomes inadequate, the inkjet ink may be readily repelled, especially in printing on a glossy offset coated medium.

Further, when the amount of the fluorine-based surfactant is increased in excess of the above range, not only no further effects is obtained, but also the inkjet ink entrains bubbles more readily, whereby the discharge stability during discharge from the fine nozzles may degrade. Meanwhile, when the blending ratio (weight ratio) P/S of the polar aprotic solvent P and the fluorine-based surfactant F is set P/F=45/1 to 100/1 these problems can be prevented and even better printing can be performed on hydrophobic media.

The surface of the pigment contained in the inkjet ink is preferably modified by carboxylic groups. The pigment can thereby be provided with a suitable hydrophilic property and be improved in dispersion stability in the inkjet ink.

In performing printing on an offset coated medium or other hydrophobic medium using the above-described inkjet ink according to the present invention, drying by heating is preferably performed immediately after printing. The polar aprotic solvent can thereby be made to permeate into the hydrophobic surface of the coating of the offset coated medium, etc., to aid the effect of improving the drying property of the inkjet ink, whereby printing on a hydrophobic medium can be performed at a printing speed substantially equivalent to printing using normal and aqueous inkjet ink on a surface of a water-absorbing printing object.

Preferred Embodiments of the Invention

The present invention is now described.
<<Inkjet Ink>>
The present invention relates to an inkjet ink for printing on hydrophobic media including: a pigment, water, a surfactant, and a polar aprotic solvent having a molecular weight of 40 to 130, wherein the content proportion of the polar aprotic solvent is 40 to 75 weight %.
<Polar Aprotic Solvent>
As the polar aprotic solvent, a solvent having a molecular weight of 40 to 130 is selected and used from among various polar aprotic solvents that do not produce or receives hydrogen ions. The content proportion of this solvent is limited to 40 to 75 weight % with respect to the total amount of the inkjet ink. The reasons for these are as have been described above. Further, as described above, the polar aprotic solvent having a boiling point of 150 to 250° C. is favorably used. Within the above-described molecular weight range, the molecular weight of the polar aprotic solvent is especially preferably 45 to 115 in consideration of suppressing the increase of the viscosity of the inkjet ink and further improving the discharge stability. Further, within the above-described content range, the content proportion of the polar aprotic solvent is especially preferably 45 to 70 weight % in consideration of suppressing the increase of the viscosity of the inkjet ink and further improving the discharge stability.

As an example of a favorable polar aprotic solvent that meets the above conditions, at least one type of solvent selected from the group consisting of 1,3-dimethyl-2-imidazolidinone [molecular weight: 114.2, boiling point: 225.5° C.], N-methyl-2-pyrrolidone [molecular weight: 99.1, boiling point: 202° C.], 2-pyrrolidone [molecular weight: 85.1, boiling point: 245° C.], formamide [molecular weight: 45.0, boiling point: 210° C.], N-methylformamide [molecular weight: 59.1, boiling point: 197° C.], N,N-dimethylformamide [molecular weight: 73.1, boiling point: 153° C.], N,N-diethylpropionamide [molecular weight: 129.2, boiling point: 195° C.], and γ-butyrolactone [molecular weight: 86.1, boiling point: 204° C.] can be cited.

<Surfactant I>

Among the various conventionally known surfactants, a surfactant having a dynamic contact angle at 23° C. of no more than 20° is preferable as the surfactant. As a surfactant having a dynamic contact angle at 23° C. of no more than 20°, a silicone-based surfactant is preferable. Further, when the surfactant having a dynamic contact angle 23° C. of no more than 20° is a silicone-based surfactant, the blending ratio (weight ratio) P/S of the polar aprotic solvent P and the silicone-based surfactant S is preferably P/S=45/1 to 70/1 as described above. The reasons for the above are as have been described already.

Although the lower limit of the dynamic contact angle is not limited in particular, when the dynamic contact angle of the surfactant is too low, the wetting property of the inkjet ink with respect to a hydrophobic surface becomes too good, thereby causing the inkjet ink to bleed before heating and a clear print with sharp edges may not be obtained. The dynamic contact angle at 23° C. is preferably no less than 15°.

The dynamic contact angle is an angle formed by a droplet of a 0.1% aqueous solution of a surfactant to be measured and a substrate surface of a stainless steel SUS 304 as measured, for example, using an automatic contact angle meter, such as CA-V, manufactured by Kyowa Interface Science Co., Ltd., 300 ms after a contact of the droplet with the substrate surface upon dropping the surfactant solution onto the substrate surface under an environment of 23° C.

Olfine (registered trade name) PD-501, manufactured by Nissin Chemical Industry Co., Ltd., can be cited as an example of a favorable surfactant that meets the above conditions.

<Surfactant II>

In an inkjet ink according to another embodiment of the present invention, the combination of a silicone-based surfactant $S_1$ expressed by the Formula (1):

[Chemical Formula 4]

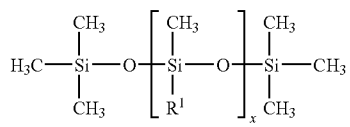

(1)

[where $R^1$ indicates a polyalkylene oxide chain containing at least one or more ethylene oxide groups or propylene oxide groups, and x indicates a numeral of no less than 1] and a silicone-based surfactant $S_2$ expressed by the Formula (2):

[Chemical Formula 5]

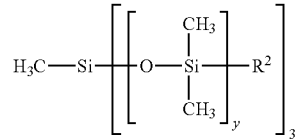

(2)

[where $R^2$ indicates a polyalkylene oxide chain containing at least one or more ethylene oxide groups or propylene oxide groups, and y indicates a numeral of no less than 1] are used in combination as the surfactant.

In this combination, it is necessary that the blending ratio (weight ratio) $S_1/S_2$ of the two silicone-based surfactants is $S_1/S_2$=6/4 to 4/6. Further, the blending ratio (weight ratio) $P/(S_1+S_2)$ of the polar aprotic solvent P and the two silicone-based surfactants $S_1$ and $S_2$ is preferably $P/(S_1+S_2)$=45/1 to 70/1. The reasons for these are as have been described above.

SILWET L-77, manufactured by Dow Corning Toray Silicone Co., Ltd., KF-643, manufactured by Shin-Etsu Chemical Co., Ltd., etc., can be cited as favorable examples of the silicone-based surfactant expressed by the Formula (1). SILWET L-720, manufactured by Dow Corning Toray Silicone Co., Ltd., can be cited as a favorable example of the silicone-based surfactant expressed by the Formula (2).

The pH of the inkjet ink using the above two types of silicone-based surfactants in combination is preferably adjusted to 7.3 to 7.7. When the pH falls outside this range, the silicone-based surfactant expressed by the Formula (1) undergoes change with time and in particular, the wetting property of the inkjet ink with respect to a glossy offset coated medium may degrade. Further, if the pH is less than 7.3, when the inkjet ink is combined with a binder resin which is essentially insoluble in water and is selectively soluble in an alkaline aqueous solution having a basic substance dissolved therein to improve the water resistance of the print, it may not be possible to dissolve the binder resin in the inkjet ink satisfactorily. A suitable basic substance can be added to adjust the pH of the inkjet ink to fall within the above-described range.

<Surfactant III>

In an inkjet ink according to still another embodiment of the present invention, a fluorine-based surfactant expressed by the Formula (3):

[Chemical Formula 6]

$C_mF_{2m+1}COONH_4$ (3)

[where m indicates a numeral of no less than 1]
is used as the surfactant. The reasons for this are as has been described already.

Surflon (registered trade name) S-111N, manufactured by Seimi Chemical Co., Ltd., can be cited as a favorable example of the fluorine-based surfactant expressed by the Formula (3). The Surflon S-111N is a solution in which a mixture of a main component with m in the Formula (3) of 8 and slight amounts with m=10 or 12 are dissolved in a mixed solvent of isopropyl alcohol and water, and the concentration of the above compound as the effective component is 30 weight %.

<Pigment>

As the pigment, any inorganic and/or organic pigment that is normally used in inkjet inks for inkjet can be used. As examples of inorganic pigments, one or more types among titanium oxide, iron oxide, and other metal compounds, or carbon black, manufactured by a known method, such as a contact method, furnace method, thermal method, etc., can be cited.

As examples of organic pigments, one or more types among azo pigments (including azo lakes, insoluble azo pigments, condensed azo pigments, and chelated azo pigments), polycyclic pigments (for example, phthalocyanine pigments, perylene pigments, perinone pigments, anthraquinone pigments, quinacridone pigments, dioxazine pigments, thioindigo pigments, isoindolinone pigments, quinophthalone pigments, etc.), dye chelates (for example, basic dye chelates, acidic dye chelates, etc.), nitro pigments, nitroso pigments, aniline black, etc., can be cited.

Specific examples of yellow pigments include C. I. Pigment Yellow 74, 109, 110, and 138, specific examples of magenta pigments include C. I. Pigment Red 122, 202, and 209, specific examples of cyan pigments include C. I. Pigment Blue 15:3 and 60, specific examples of black pigments include C. I. Pigment Black 7, specific examples of orange pigments include C. I. Pigment Orange 36 and 43, and specific examples of green pigments include C. I. Pigment Green 7 and 36, etc.

One or more types of pigments may be used according to the color type of the inkjet ink. The content proportion of the pigment is preferably 0.1 to 30 weight % with respect to the total amount of the inkjet ink.

The surface of the pigment is preferably modified and has hydrophilic groups introduced thereon to provide the pigment with hydrophilicity and improve its dispersion stability in the inkjet ink. Examples of hydrophilic groups to be introduced on the surface of the pigment by modification include carboxylic groups, sulfonic groups, etc. Carboxylic groups are especially preferable. Whereas a pigment that is modified by sulfonic groups is too high in hydrophilicity and is such that the dispersion stability in the inkjet ink according to the present invention that contains a large amount of the polar aprotic solvent as described above may become poor, a pigment that is provided with suitable hydrophilicity by modification by carboxylic groups is excellent in dispersion stability, especially in the inkjet ink according to the present invention. The pigment is preferably used in the manufacture of the inkjet ink in a state of a pigment dispersion in which the pigment is dispersed in water using a dispersing agent.

In addition to the respective components described above, the inkjet ink according to the present invention may contain an ethylene oxide adduct of an organic acid and other components to be described below.

<Ethylene Oxide Adduct of Organic Acid>

By making an ethylene oxide adduct of an organic acid salt contained in an inkjet ink, the discharge stability of the inkjet ink can be improved, especially in a thermal jet (registered trade name) type inkjet printer.

Although the reasons are not clear, it is considered that when in a thermal jet type inkjet printer, an inkjet ink is heated instantaneously to a high temperature (approximately 400° C.), the above-described ethylene oxide adduct of an organic acid salt tends to become adsorbed onto the surface of the pigment so as to prevent the destruction of the dispersion stability of the pigment thereby to contribute to the dispersion stability.

Examples of the ethylene oxide adduct of the organic acid salt include compounds, in which ethylene oxide is adducted to sodium salts, potassium salts, and other alkali metal salts or ammonium salts of various mono- to tri-carboxylic acids, such as citric acid, gluconic acid, tartaric acid, lactic acid, D-malic acid, L-malic acid, etc.

In particular, in terms of improving the discharge stability of the inkjet ink, at least one type of compound, selected from the group consisting of ethylene oxide adducts of alkali metal salts of citric acid, such as sodium citrate and potassium citrate, and ethylene oxide adducts of ammonium citrate that are expressed by a Formula (4):

[Chemical Formula 7]

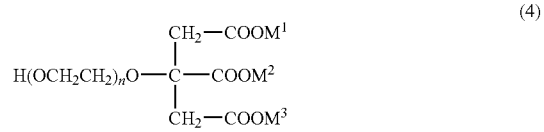

(4)

[where $M^1$, $M^2$, and $M^3$ may be the same or may differ, with each indicating sodium, potassium, or other alkali metal, the ammonium group, or hydrogen, but with not all of $M^1$, $M^2$, and $M^3$ indicate hydrogen at the same time, and n indicates a numeral from 1 to 28]

is preferable.

A compound in the above Formula with which the n exceeds 28 may lower the discharge stability of the inkjet ink by increasing the viscosity of the inkjet ink or by separating in the inkjet ink due to reducing solubility in water. The content proportion of the above compound is preferably 0.1 to 5.0 weight % and more preferably 0.3 to 3.0 weight % with respect to the total amount of the inkjet ink. When the content proportion is below this range, the above-described effects of improving the discharge stability of the inkjet ink provided by the containing of the compound may be inadequate. When the content proportion exceeds the above range, clogging of the nozzles, etc., may occur.

<Polyoxyethylene Phenyl Ether and Polyoxyethylene Alkyl Phenyl Ether>

When the inkjet ink is made to contain at least one type of compound selected from the group consisting of polyoxyethylene phenyl ethers, expressed by the Formula (5):

[Chemical Formula 8]

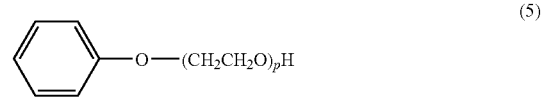

(5)

[where p indicates a numeral from 3 to 28]
and polyoxyethylene alkyl phenyl ethers, expressed by the Formula (6):

[Chemical Formula 9]

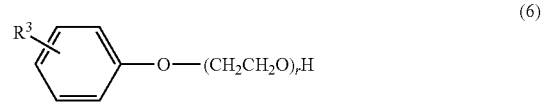

(6)

[where $R^3$ indicates an alkyl group with 8 to 10 carbons and r indicates a numeral from 3 to 28]

the function of the above-described ethylene oxide adduct of organic acid salt is aided and the discharge stability of the inkjet ink is thereby improved further.

With these compounds, the reason why the p in the Formula (5) expressing the polyoxyethylene phenyl ether is preferably 3 to 28 is because a compound for which the p falls outside this range may be inadequate in the effect of aiding the function of the ethylene oxide adduct of organic acid salt. In particular, a compound with which the p in the above Formula exceeds 28 may lower the discharge stability of the inkjet ink by increasing the viscosity of the inkjet ink or by separating in the inkjet ink due to reducing solubility in water.

As a specific example of the polyoxyethylene phenyl ether of the Formula (5), the compound expressed by the Formula (5-1):

[Chemical Formula 10]

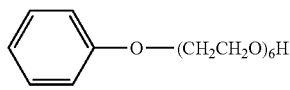

(5-1)

with which the p is 6, can be cited.

With the polyoxyethylene alkyl phenyl ether expressed by the Formula (6), the reason why the r in the Formula is preferably 3 to 28 and the number of carbons of the alkyl group indicated by $R^3$ is preferably 8 to 10 is because a compound for which the r falls outside the corresponding range, or a compound for which the number of carbons of the alkyl group indicated by $R^3$ falls outside the corresponding range may be inadequate in the effect of aiding the function of the ethylene oxide adduct of organic acid salt. In particular, a compound with which the r exceeds 28, or a compound for which the number of carbons of the alkyl group indicated by $R^3$ exceeds 10 may lower the discharge stability of the inkjet ink by increasing the viscosity of the inkjet ink or by separating in the inkjet ink due to reducing solubility in water.

As a specific example of the polyoxyethylene alkyl phenyl ether of the Formula (6), the compound expressed by a Formula (6-1):

[Chemical Formula 11]

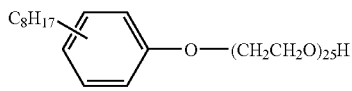

(6-1)

with which the r is 25 and the number of carbons of the alkyl group indicated by $R^3$ is 8 can be cited. Although compounds of Formula (6) include three types of compounds with which the alkyl group indicated by $R^3$ is bound to the o-position, m-position, or p-position with respect to the polyoxyethylene group on the phenyl group, any of these may be used in the present invention. A mixture of two or more types of these compounds may be used as well.

The content proportion of the polyoxyethylene phenyl ether of the Formula (5) and/or the polyoxyethylene alkyl phenyl ether of the Formula (6) is preferably 0.1 to 7.0 weight % and more preferably 0.5 to 6.0 weight % with respect to the total amount of the inkjet ink. When the content proportion is below this range, the above-described aiding effect to aid stabilizing the discharge of the inkjet ink that is provided by the containing of these compounds may be inadequate. When the content proportion exceeds the above range, clogging may occur inside the head.

When a compound of one of either Formula (5) or (6) is used alone, the above-described content proportion is the content proportion of the compound on its alone, and when two or more types are used in combination, the above-described content proportion is the total content proportion of the combined compounds. Because it is considered that the compounds of the Formulae (5) and (6) differ in the mechanism of the aiding effect, combined use of both is preferable. A combined system of the compound of Formula (5-1) and the compound of Formula (6-1) is especially preferable in terms of the aiding effect.

<Acetylene Glycols and Glycol Ethers>

When an acetylene glycol and/or a glycol ether is contained in the inkjet ink, because these compounds provide a supplementing effect to supplement the aiding effect of the polyoxyethylene phenyl ether of the Formula (5) and/or the polyoxyethylene alkyl phenyl ether of the Formula (6), the discharge stability of the inkjet ink can be further improved.

Among these, as examples of acetylene glycols, one or more types of compounds among Surfynol (registered trade name) 104 and other products of this series manufactured by Air Products and Chemicals Inc., Surfynol 420, 440, 465, and 485, manufactured by the same, Dynol 604, manufactured by the same, Olfine E4001, 4036, and 4051, manufactured by Nissin Chemical Industry Co., Ltd., etc., can be cited.

The content proportion of the acetylene glycol is preferably 0.01 to 5.0 weight % and more preferably 0.05 to 3.0 weight % with respect to the total amount of the inkjet ink. When the content proportion is below this range, the above-described supplementing effect that is provided by containing the compound may be inadequate. When the content proportion exceeds the above range, the water resistance of the print may degrade.

When an acetylene glycol expressed by the Formula (7)

[Chemical Formula 12]

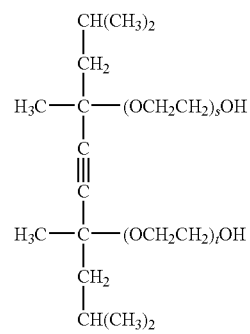

(7)

[where each of s and t separately indicates a numeral from 0 to 40, but s and t are not both 0 at the same time and s+t indicates numeral from 1 to 40]

is combined with the above-described combined system of the two types of silicone-based surfactant or with the fluorine-based surfactant of the Formula (3), an effect of improving the wetting property of the inkjet ink, especially with respect to glossy offset coated media can be provided in addition to the above-described supplementing effect.

As examples of acetylene glycols expressed by the Formula (7), Surfynol 420 [made up of a mixture of a plurality of components of the Formula (7) in which the values of s and t differ, with the average value of s+t being 1.3], Surfynol 440 [made up of a mixture of a plurality of components of the Formula (7) in which the values of s and t differ, with the average value of s+t being 3.5], Surfynol 465 [made up of a mixture of a plurality of components of the Formula (7) in which the values of s and t differ, with the average value of s+t being 10], and Surfynol 485 [made up of a mixture of a plurality of components of the Formula (7) in which the values of s and t differ, with the average value of s+t being 30], respectively manufactured by Air Products and Chemicals Inc., can be cited from among the various compounds given as examples above.

Meanwhile, as examples of glycol ethers, one or more types of compounds among ethylene glycol monobutyl ether, diethylene glycol monobutyl ether, triethylene glycol monobutyl ether, ethylene glycol monoisobutyl ether, diethylene glycol monoisobutyl ether, ethylene glycol monohexyl ether, diethylene glycol monohexyl ether, ethylene glycol mono-2-ethylhexyl ether, diethylene glycol mono-2-ethylhexyl ether, etc., can be cited.

The content proportion of the glycol ether is preferably 0.5 to 10.0 weight % and more preferably 2.0 to 7.0 weight % with respect to the total amount of the inkjet ink. When the content proportion is below this range, the above-described supplementing effect that is provided by containing the compound may be inadequate. When the content proportion exceeds the above range, because the compound is a non-volatile liquid, it may become difficult to dry the inkjet ink. The storage stability of the inkjet ink may also degrade.

<Binder Resin I>

When a binder resin is contained in the inkjet ink, because the binder resin functions as a binder of the pigment and the hydrophobic surface, such as coating of an offset coated medium, the water resistance and the abrasion resistance of the print, the sharpness of the print, etc., can be improved. In particular, when a binder resin that is essentially insoluble in water and is selectively soluble in an alkali aqueous solution in which a basic compound is dissolved, is used as a binder, the water resistance of the print can be further improved.

As an alkali-soluble binder resin, for example, a resin is preferably having carboxylic groups in the molecule and insoluble in water as it is, while the resin is added in an alkali aqueous solution containing a basic substance, such as ammonia, organic amine, caustic alkali, etc., the carboxylic group portion thereof reacts with the basic substance and the resin dissolves in the solution with producing a water soluble salt.

As favorable examples, one or more types of resins, especially, high acid value resins, among acrylic resins, such as polyacrylic acid, acrylic acid-acrylonitrile copolymers, potassium acrylate-acrylonitrile copolymers, vinyl acetate-acrylate copolymers, and acrylic acid-alkyl acrylate copolymers; styrene-acrylic acid resins, such as styrene-acrylic acid copolymers, styrene-methacrylic acid copolymers, styrene-methacrylic acid-alkyl acrylate copolymers, styrene-α-methyl styrene-acrylic acid copolymers, and styrene-α-methyl styrene-acrylic acid-alkyl acrylate copolymers; and maleic acid resins, fumaric acid resins, styrene-maleic acid copolymer resins, styrene-maleic anhydride copolymer resins, etc., that are adjusted in molecular weight, acid value, etc., so as to have the characteristics described above, can be cited.

Among the above, an alkali-soluble acrylic resin is especially preferable, and as specific examples, NeoCryl (registered trade name) B-817 (weight average molecular weight Mw: 23,000) and NeoCryl B-890 (weight average molecular weight Mw: 12,500), manufactured by Avecia Limited, and Johncryl (registered trade name) 67 (weight average molecular weight Mw: 12,500), manufactured by Johnson Polymer Corporation, can be cited.

In consideration of improving the water resistance and the abrasion resistance of the print, the alkali-soluble binder resin preferably has a weight average molecular weight Mw of no less than 10,000. However, when the molecular weight is too high, deposition, precipitation, etc., of the binder resin occur readily and the discharge of the inkjet ink may become unstable. Deposition, precipitation, etc., of the binder resin during storage of the inkjet ink may also occur readily. The weight average molecular weight Mw of the binder resin is preferably no more than 50,000 within the above range, and in consideration of these factors, is more preferably approximately 20,000 to 40,000.

The content proportion of the binder resin is preferably 0.1 to 3.0 weight % and more preferably 0.5 to 2.0 weight % with respect to the total amount of the inkjet ink. When the content proportion is below this range, the effect of fixing the pigment onto the non-aqueous surface, etc., and improving the water resistance and the abrasion resistance of the print and the sharpness of the print may become inadequate. In the case where the content proportion exceeds the above range, when the viscosity of the inkjet ink inside a printer head increases locally in accordance with the vaporization of water in a thermal jet system as mentioned above, the discharge of the ink may become unstable and excess binder resin may separate to cause clogging inside the head.

<Binder Resin II>

An inkjet printer normally has a mechanism for capping and closing nozzles when a head is returned to a home position during a state of non-use. However, there are arrangements in which the operation of returning the head to the home position is performed manually, and with such an inkjet printer, when the head return to the home position is forgotten and the nozzles are left in an uncapped state for a while, the viscosity of the inkjet ink increases to cause faints and other print defects readily in initial stages when printing is restarted.

Thus, in the inkjet ink for an inkjet printer of the type in which the operation of returning the head to the home position is performed manually, the use of a binder resin with a weight average molecular weight Mw of 1,000 to 3,000 and especially 1,000 to 2,000 is preferable for preventing faints and other print defects reliably. Because an inkjet ink that contains a binder resin of such low weight average molecular weight Mw does not increase viscosity suddenly even if the nozzles are left uncapped, faints and other print defects are not produced in the initial stages when printing is restarted.

When the binder resin with the weight average molecular weight Mw of 1,000 to 3,000 is used in an aqueous inkjet ink and printing is performed on general paper, etc., the effect of improving the water resistance and the abrasion resistance cannot be obtained. However, with the inkjet ink according to the present invention which contains the polar aprotic solvent at the large amount of 40 to 75 weight % and prints by permeation into the coating of an offset coated medium while slightly dissolving the coating by the polar aprotic solvent, even if the binder resin with the weight average molecular weight Mw of 1,000 to 3,000 is used, the effect of improving the water resistance and the abrasion resistance can be improved adequately to levels without problem in terms of practical use.

The other characteristics of the binder resin are preferably the same as those of binder resins of high molecular weight described above. That is, preferably in terms of improving the water resistance of the print, the binder resin is essentially insoluble in water and selectively soluble in an alkali aqueous solution in which a basic substance is dissolved. As an example of such a binder resin with a weight average molecular weight Mw of 1,000 to 3,000 that satisfies these conditions, Johncryl 682 (weight average molecular weight Mw: 1,700), manufactured by Johnson Polymer Corporation, can be cited.

The content proportion of the binder resin is preferably 0.1 to 3.0 weight % and more preferably 0.5 to 2.0 weight % with respect to the total amount of the inkjet ink. When the content proportion is below this range, the print may not be provided with water resistance and abrasion resistance of levels without problem in terms of practical use and sharp printing may not be possible. When the content proportion exceeds the above range, faints may occur in the print and nozzles may become clogged.

<Basic Substance>

The basic substance is used to make the inkjet ink alkaline to dissolve the binder resin as mentioned above, to prevent corrosion of the head, and to maintain the dispersion stability of the pigment. As the basic substance, ammonia, an organic amine, or a caustic alkali, etc., is preferable as mentioned above.

As examples of the organic amine, one type or two or more types of compounds among monoethanolamine, diethanolamine, triethanolamine, ethylmonoethanolamine, ethyldiethanolamine, monoisopropanolamine, diisopropanolamine, triisopropanolamine, mono-1-propanolamine, 2-amino-2-methyl-1-propanol, and derivatives thereof can be cited.

The added amount of the basic substance can be adjusted appropriately according to the acid value that indicates the free fatty acid content of the binder resin or the pH of the inkjet ink in the state in which the basic substance is not added. In general, the added amount is preferably 0.05 to 2 parts by weight and more preferably 0.075 to 1.5 parts by weight to 1 part by weight of the binder resin. When the added amount is below this range, because the binder resin cannot be dissolved adequately, a uniform inkjet ink may not be obtained. When the content exceeds the above range, the pH of the ink becomes too high and may cause problems in terms of safety or may cause corrosion of the head of the inkjet printer.

<Other Additives>

In addition to the respective components described above, various conventionally known additives for inks may be added to the inkjet ink composition according to the present invention. Such additives include, for example, pigment dispersing agents, antifungal agents, biocidal agents, etc.

Besides the use in the above-described thermal jet type, piezo type, and other so-called on-demand type inkjet printers, the manufactured ink composition can be used in so-called continuous type inkjet printers in which printing is performed by forming ink droplets while circulating the ink.

<<Printing Method>>

The printing method according to the present invention is characterized in including the steps of printing on a hydrophobic medium by an inkjet printing method using the inkjet ink according to the present invention and heating the hydrophobic medium after printing.

In the printing step, printing is performed under normal conditions using an above-described thermal jet type, piezo type, or other so-called on-demand type inkjet printer or a continuous type inkjet printer, etc. In the heating step, a heater is positioned in continuation to a printed object exit of the inkjet printer and heating at a predetermined temperature can be performed for a predetermined time. Although the conditions of heating temperature, heating time, etc., are not limited in particular, so as not to extend the time required for printing, it is preferable to set the heating time to no more than 10 seconds and preferably to approximately 1 to 5 seconds.

EXAMPLES

The present invention shall now be described based on Examples and Comparative Examples.

Example 1

Manufacture of the Inkjet Ink

A carbon black dispersion [Cabojet 300, manufactured by Cabot Corporation, carboxylic group modified, aqueous dispersion, 15 weight % of solids] was used as the pigment, and 1,3-dimethyl-2-imidazolidinone [molecular weight: 114.2, boiling point: 225.5° C.] was used as the polar aprotic solvent. A silicone-based surfactant [Olfine PD-501, manufactured by Nissin Chemical Industry Co., Ltd., dynamic contact angle at 23° C.: 16.1°] was used as the surfactant, and an ethylene oxide adduct of sodium citrate with which the p in the Formula (4) is 6 and all of $M^1$ to $M^3$ are sodium was used as the ethylene oxide adduct of organic acid.

As the binder resin, an alkali-soluble acrylic resin [NeoCryl B-817, manufactured by Avecia Limited, weight average molecular weight Mw: 23,000] was used, and as the basic substance for dissolving the binder resin in the inkjet ink, 2-amino-2-methyl-1-propanol was used. As the polyoxyethylene phenyl ether, the compound expressed by the Formula (5-1) was used, and as the polyoxyethylene alkyl phenyl ether, the compound expressed by the Formula (6-1) was used. As the acetylene glycols, Olfine E4001, manufactured by Nissin Chemical Industry Co., Ltd., was used, and as the biocidal agent, Proxel (registered trade name) XL-2, manufactured by Zeneca Co., Ltd. was used.

The respective components mentioned above were blended at the proportions given below in ion-exchanged water, and after mixing by stirring, the mixture was filtered using a membrane filter of 5 μm to manufacture the inkjet ink. The blending ratio (weight ratio) P/S of the polar aprotic solvent P and the silicone-based surfactant S was 61/1.

| (Component) | (Parts by weight) |
|---|---|
| Carbon black dispersion | 15 |
| 1,3-dimethyl-2-imidazolidinone | 48.5 |
| Silicone-based surfactant | 0.8 |
| Binder resin | 1 |
| 2-amino-2-methyl-1-propanol | 0.2 |
| Ethylene oxide adduct of sodium citrate | 0.5 |
| $C_6H_5O(CH_2CH_2O)_6H$ | 0.5 |
| $C_8H_{17}C_6H_4O(CH_2CH_2O)_{25}H$ | 0.5 |
| Ethanol | 2 |
| Acetylene glycol | 1 |
| Biocidal agent | 0.2 |
| Ion-exchanged water | 29.8 |

Examples 2 to 8

In place of 1,3-dimethyl-2-imidazolidinone, except using the same amounts of N-methyl-2-pyrrolidone [molecular weight: 99.1, boiling point: 202° C.] (Example 2), 2-pyrrolidone [molecular weight: 85.1, boiling point: 245° C.] (Example 3), formamide [molecular weight: 45.0, boiling point: 210° C.] (Example 4), N-methylformamide [molecular weight: 59.1, boiling point: 197° C.] (Example 5), N,N-dimethylformamide [molecular weight: 73.1, boiling point: 153° C.] (Example 6), N,N-diethylpropionamide [molecular weight: 129.2, boiling point: 195° C.] (Example 7), and γ-butyrolactone [molecular weight: 86.1, boiling point: 204° C.] (Example 8) as the polar aprotic solvents, inkjet inks were manufactured in the same manner as in Example 1.

Example 9

Except setting the amount of the 1,3-dimethyl-2-imidazolidinone as the polar aprotic solvent to 40 parts by weight, the amount of the silicone-based surfactant to 0.7 parts by weight, the ratio P/S of the two components to 57/1, and the amount of the ion-exchanged water to 38.4 parts by weight, an inkjet ink was manufactured in the same manner as in Example 1.

Example 10

Except setting the amount of the 1,3-dimethyl-2-imidazolidinone as the polar aprotic solvent to 70 parts by weight, the amount of the silicone-based surfactant to 1.1 parts by weight, the ratio P/S of the two components to 64/1, and the amount of the ion-exchanged water to 8 parts by weight, an inkjet ink was manufactured in the same manner as in Example 1.

Example 11

Except setting the amount of the 1,3-dimethyl-2-imidazolidinone as the polar aprotic solvent to 75 parts by weight, the amount of the silicone-based surfactant to 1.2 parts by weight, and the ratio P/S of the two components to 63/1, and the amount of the ion-exchanged water to 2.9 parts by weight, an inkjet ink, was manufactured in the same manner as in Example 1.

Example 12

In place of Olfine PD-501, except using the same amount of a silicone-based surfactant with which the dynamic contact angle at 23° C. is 19.8° as the silicone-based surfactant, an inkjet ink was manufactured in the same manner as in Example 1.

Example 13

In place of Olfine PD-501, except using the same amount of a silicone-based surfactant with which the dynamic contact angle at 23° C. is 24.3° as the silicone-based surfactant, an inkjet ink was manufactured in the same manner as in Example 1.

Example 14

Except setting the amount of the 1,3-dimethyl-2-imidazolidinone as the polar aprotic solvent to 48 parts by weight, the amount of the silicone-based surfactant to 1.2 parts by weight, the ratio P/S of the two components to 40/1, and the amount of the ion-exchanged water to 29.9 parts by weight, an inkjet ink was manufactured in the same manner as in Example 1.

Example 15

Except setting the amount of the 1,3-dimethyl-2-imidazolidinone as the polar aprotic solvent to 49.5 parts by weight, the amount of the silicone-based surfactant to 1.1 parts by weight, the ratio P/S of the two components to 45/1, and the amount of the ion-exchanged water to 18.5 parts by weight, an inkjet ink was manufactured in the same manner as in Example 1.

Example 16

Except setting the amount of the 1,3-dimethyl-2-imidazolidinone as the polar solvent to 48.5 parts by weight, the amount of the silicone-based surfactant to 0.7 parts by weight, the ratio P/S of the two components to 69/1, and the amount of the ion-exchanged water to 29.9 parts by weight, an inkjet ink was manufactured in the same manner as in Example 1.

Example 17

Except setting the amount of the 1,3-dimethyl-2-imidazolidinone as the polar aprotic solvent to 52.5 parts by weight, the amount of the silicone-based surfactant to 0.7 parts by weight, the ratio P/S of the two components to 75/1, and the amount of the ion-exchanged water to 25.9 parts by weight, an inkjet ink was manufactured in the same manner as in Example 1.

Example 18

In place of Cabojet 300, except using the same amount of a carbon black dispersion [Cabojet 200, manufactured by Cabot Corporation, sulfonic group modified, aqueous dispersion, 15 weight % of solids] as the pigment, an inkjet ink was manufactured in the same manner as in Example 1.

Comparative Example 1

Except setting the amount of the 1,3-dimethyl-2-imidazolidinone as the polar aprotic solvent to 35 parts by weight, the amount of the silicone-based surfactant to 0.6 parts by weight, the ratio P/S of the two components to 61/1, and the amount of the ion-exchanged water to 33.5 parts by weight, an inkjet ink was manufactured in the same manner as in Example 1.

Comparative Example 2

Except setting the amount of the 1,3-dimethyl-2-imidazolidinone as the polar aprotic solvent to 77.9 parts by weight, the amount of the silicone-based surfactant to 1.2 parts by weight, the ratio P/S of the two components to 66/1, and not blending in the ion-exchanged water, an inkjet ink was manufactured in the same manner as in Example 1.

Comparative Example 3

Except using N,N-dibutylformamide [molecular weight: 157.3, boiling point: 240° C.] as the polar aprotic solvent, an inkjet ink was manufactured in the same manner as in Example 1.

The following tests were carried out on the inkjet inks manufactured in the respective Examples and Comparative Examples to evaluate the characteristics of the inks.

<<Discharge Stability Test I>>

Each of the inkjet inks of the Examples and Comparative Examples was filled into an empty black ink cartridge [Part No. 51645A, manufactured by Hewlett-Packard Development Company, L.P.] for a thermal jet type inkjet ink printer [Desk Jet 970Cxi, manufactured by Hewlett-Packard Development Company, L.P.], and a line of a line width of 0.5 points was printed on a commercially available glossy paper. The print was then observed, and the discharge stability of the inkjet ink was evaluated according to the following standards.

Excellent: No faints were seen at all at the start of printing, and the line was printed without interruption in the middle. The discharge stability was evaluated extremely good.

Good: Although faints were seen at the start of printing, thereafter, the line was printed without interruption in the middle. The discharge stability was evaluated as reaching a practical level.

Poor: The line was interrupted in the middle. The discharge stability was evaluated poor.

<<Drying Property Test>>

Using the same thermal jet type inkjet ink printer [Desk Jet 970Cxi, manufactured by Hewlett-Packard Development Company, L.P.] as described above, printing by each of the inkjet inks of the Examples and Comparative Examples on an offset coated medium (packaging material of the above-described ink cartridge) was performed, and then after heating for 2 seconds using an oven toaster at an output of 500 W, the print was rubbed with a cotton swab while applying a load of 20 g. The print was then observed, and the drying property of the inkjet ink was evaluated according to the standards below: Measurement of glossiness by a micro-Tri-gloss manufactured by BYK-Gardner GmbH showed 60° glossiness of the offset coated medium was 46.5°.

Excellent: No bleeding was seen at all. The drying property was evaluated extremely good.

Good: Although slight bleeding was seen, the drying property was evaluated as reaching a practical level.

Poor: Major bleeding was seen, and the drying property was evaluated poor.

<<Print Sharpness Test I>>

Using the same thermal jet type inkjet ink printer [Desk Jet 970Cxi, manufactured by Hewlett-Packard Development Company, L.P.] as described above, printing alphabetical characters of 10-point by each of the inkjet inks of the Examples and Comparative Examples on an offset coated medium (packaging material of the above-described ink cartridge) was performed, and then after heating for 2 seconds using an oven toaster at an output of 500 W, the print was observed and the print sharpness of the inkjet ink was evaluated according to the following standards.

Excellent: Edges were expressed sharply. The print sharpness was evaluated extremely good.

Good: Although there were some portions that somewhat lack sharpness, the print sharpness was evaluated as reaching a practical level.

Poor: The print was not sharp, and the print sharpness was evaluated poor.

The results of the above are shown in Tables 1 to 3.

TABLE 1

| | | Example | | | | | | |
|---|---|---|---|---|---|---|---|---|
| | | 1 | 2 | 3 | 4 | 5 | 6 | 7 |
| Polar aprotic solvent P | Molecular weight | 114.2 | 99.1 | 85.1 | 45.0 | 59.1 | 73.1 | 129.2 |
| | Content proportion (wt %) | 48.5 | 48.5 | 48.5 | 48.5 | 48.5 | 48.5 | 48.5 |
| Dynamic contact angle of the surfactant S | | 16.1° | 16.1° | 16.1° | 16.1° | 16.1° | 16.1° | 16.1° |
| P/S | | 61/1 | 61/1 | 61/1 | 61/1 | 61/1 | 61/1 | 61/1 |
| Modification of the pigment | | Carboxylic groups | Carboxylic groups | Carboxylic groups | Carboxylic groups | Carboxylic groups | Carboxylic groups | Carboxylic groups |
| Characteristics | Discharge stability I | Excellent | Excellent | Excellent | Excellent | Excellent | Excellent | Good |
| | Drying property | Excellent | Excellent | Excellent | Excellent | Excellent | Excellent | Excellent |
| | Print sharpness I | Excellent | Excellent | Excellent | Excellent | Excellent | Excellent | Excellent |

TABLE 2

| | | Example | | | | | | |
|---|---|---|---|---|---|---|---|---|
| | | 8 | 9 | 10 | 11 | 12 | 13 | 14 |
| Polar aprotic solvent P | Molecular weight | 86.1 | 114.2 | 114.2 | 114.2 | 114.2 | 114.2 | 114.2 |
| | Content proportion (wt %) | 48.5 | 40 | 70 | 75 | 48.5 | 48.5 | 48 |
| Dynamic contact angle of the surfactant S | | 16.1° | 16.1° | 16.1° | 16.1° | 19.8° | 24.3° | 16.1° |
| P/S | | 61/1 | 57/1 | 64/1 | 63/1 | 61/1 | 61/1 | 40/1 |
| Modification of the pigment | | Carboxylic groups | Carboxylic groups | Carboxylic groups | Carboxylic groups | Carboxylic groups | Carboxylic groups | Carboxylic groups |
| Characteristics | Discharge stability I | Excellent | Excellent | Excellent | Good | Excellent | Excellent | Good |
| | Drying property | Excellent | Good | Excellent | Excellent | Excellent | Excellent | Excellent |
| | Print sharpness I | Excellent | Good | Excellent | Excellent | Excellent | Good | Good |

TABLE 3

|  |  | Example | | | | Comparative Example | | |
| --- | --- | --- | --- | --- | --- | --- | --- | --- |
|  |  | 15 | 16 | 17 | 18 | 1 | 2 | 3 |
| Polar aprotic solvent P | Molecular weight | 114.2 | 114.2 | 114.2 | 114.2 | 114.2 | 114.2 | 157.3 |
|  | Content proportion (wt %) | 49.5 | 48.5 | 52.5 | 48.5 | 35 | 77.9 | 48.5 |
| Dynamic contact angle of the surfactant S |  | 16.1° | 16.1° | 16.1° | 16.1° | 16.1° | 16.1° | 16.1° |
| P/S |  | 45/1 | 69/1 | 75/1 | 61/1 | 61/1 | 66/1 | 61/1 |
| Modification of the pigment |  | Carboxylic groups | Carboxylic groups | Carboxylic groups | Sulfonic groups | Carboxylic groups | Carboxylic groups | Carboxylic groups |
| Characteristics | Discharge stability I | Excellent | Excellent | Excellent | Good | Excellent | Poor | Poor |
|  | Drying property | Excellent | Excellent | Excellent | Excellent | Poor | Excellent | Excellent |
|  | Print sharpness I | Excellent | Excellent | Good | Excellent | Poor | Excellent | Excellent |

The results for Examples 1 to 8 and Comparative Example 3 in the Tables show that a polar aprotic solvent having a molecular weight to 40 to 130 must be used as the polar aprotic solvent, and the results for Examples 1 and 9 to 11 and Comparative Examples 1 and 2 show that the content proportion of the polar aprotic solvent must be 40 to 75 weight %. The results for Examples 1, 12, and 13 show that the dynamic contact angle at 23° C. of the surfactant is preferably no more than 20°, the results for Examples 1 and 14 to 17 show that the blending ratio (weight ratio) P/S of the polar aprotic solvent P and the silicone-based surfactant S is preferably in the range of 45/1 to 70/1, and the results of Examples 1 and 18 show that the surface of the pigment is preferably modified by carboxylic groups.

Example 19

Manufacture of the Inkjet Ink

A carbon black dispersion [Cabojet 300, manufactured by Cabot Corporation, carboxylic group modified, aqueous dispersion, 15 weight % of solids] was used as the pigment, and 1,3-dimethyl-2-imidazolidinone [molecular weight: 114.2, boiling point: 225.5° C.] was used as the polar aprotic solvent. As the surfactants, SILWET L-77, manufactured by Dow Corning Toray Silicone Co., Ltd., was used as the silicone-based surfactant expressed by the Formula (1), and SILWET L-720, manufactured by Dow Corning Toray Silicone Co., Ltd., was used as the silicone-based surfactant expressed by the Formula (2).

An ethylene oxide adduct of sodium citrate, with which the p in the Formula (4) is 6 and all of $M^1$ to $M^3$ are sodium, was used as the ethylene oxide adduct of organic acid. As the binder resin, an alkali-soluble acrylic resin [NeoCryl B-817, manufactured by Avecia Limited, weight average molecular weight Mw: 23,000] was used, and as the basic substance for dissolving the binder resin in the inkjet ink, 2-amino-2-methyl-1-propanol was used. As the polyoxyethylene phenyl ether, the compound expressed by the Formula (5-1) was used, and as the polyoxyethylene alkyl phenyl ether, the compound expressed by the Formula (6-1) was used. As the acetylene glycols, Surfynol 420 [made up of a mixture of a plurality of components of the Formula (7) that differ in the values of s and t, with the average value of s+t being 1.3], manufactured by Air Products and Chemicals Inc., was used, and as the biocidal agent, Proxel XL-2, manufactured by Zeneca Co., Ltd. was used.

The respective components mentioned above were blended at the proportions given below in ion-exchanged water, and after mixing by stirring, the mixture was filtered using a membrane filter of 5 μm to manufacture the inkjet ink. The blending ratio (weight ratio) $S_1/S_2$ of the two types of the silicone-based surfactants $S_1$ and $S_2$ was 5/5, and the blending ratio (weight ratio) $P/(S_1+S_2)$ of the polar aprotic solvent P and the silicone-based surfactants $S_1$ and $S_2$ was 48.5/1.

| (Component) | (Parts by weight) |
| --- | --- |
| Carbon black dispersion | 15 |
| 1,3-dimethyl-2-imidazolidinone | 48.5 |
| SILWET L-77 | 0.5 |
| SILWET L-720 | 0.5 |
| Binder resin | 1 |
| 2-amino-2-methyl-1-propanol | 0.1 |
| Ethylene oxide adduct of sodium citrate | 0.5 |
| $C_6H_5O(CH_2CH_2O)_6H$ | 0.5 |
| $C_8H_{17}C_6H_4O(CH_2CH_2O)_{25}H$ | 0.5 |
| Ethanol | 2 |
| Acetylene glycols | 1 |
| Biocidal agent | 0.2 |
| Ion-exchanged water | 29.7 |

Examples 20 to 23

Except setting the blending ratio (weight ratio) $S_1/S_2$ of SILWET L-77, manufactured by Dow Corning Toray Silicone Co., Ltd. as the silicone-based surfactant expressed by the Formula (1), and SILWET L-720, manufactured by Dow Corning Toray Silicone Co., Ltd. as the silicone-based surfactant expressed by the Formula (2) so that $S_1/S_2$=4/6 (Example 20), $S_1/S_2$=6/4 (Example 21), $S_1/S_2$=3/7 (Example 22), and $S_1/S_2$=7/3 (Example 23), the total blending amount of the two silicone-based surfactants $S_1$ and $S_2$ to 1 part by weight, and the blending ratio (weight ratio) $P/(S_1+S_2)$ of the polar aprotic solvent P and the silicone-based surfactants $S_1$ and $S_2$ to 48.5/1, inkjet inks were manufactured in the same manner as in Example 19.

The above-described discharge stability test I and drying test, and the following tests were carried out on the inkjet inks manufactured in the respective Examples to evaluate the characteristics of the inks.

<<pH Measurement>>

The pH of the inkjet ink of each Example was measured using HM-40V, manufactured by DKK-Toa Corporation.

<<Print Sharpness Test II>>

Using the same thermal jet type inkjet ink printer [Desk Jet 970Cxi, manufactured by Hewlett-Packard Development Company, L.P.] as described above, printing alphabetical characters of 10-point by each of the inkjet inks of the Examples was performed on each of a glossy offset coated medium with a 60° glossiness, as measured, by a micro-Trigloss, manufactured by BYK-Gardner GmbH, of 85.8° and a matted offset coated medium with a 60° glossiness, as measured in the same manner, of 17.2°, and then after heating for 2 seconds using an oven toaster at an output of 500 W, the prints were observed and the print sharpness of the inkjet ink was evaluated according to the following standards.

Excellent: Edges were expressed sharply. The print sharpness was evaluated extremely good.

Good: Although there were some portions that somewhat lack sharpness, the print sharpness was evaluated as reaching a practical level.

Poor: The print is not sharp, and the print sharpness was evaluated poor.

The results of the above are shown in Table 4.

TABLE 4

|  |  | Example |  |  |  |  |
|---|---|---|---|---|---|---|
|  |  | 19 | 20 | 21 | 22 | 23 |
| Polar aprotic solvent P | Molecular weight | 114.2 | 114.2 | 114.2 | 114.2 | 114.2 |
|  | Content proportion (wt %) | 48.5 | 48.5 | 48.5 | 48.5 | 48.5 |
|  | Silicone-based surfactants $S_1/S_2$ | 5/5 | 4/6 | 6/4 | 3/7 | 7/3 |
|  | $P/(S_1 + S_2)$ | 48.5/1 | 48.5/1 | 48.5/1 | 48.5/1 | 48.5/1 |
|  | pH | 7.40 | 7.42 | 7.58 | 7.55 | 7.52 |
| Characteristics | Discharge stability I | Excellent | Excellent | Excellent | Excellent | Excellent |
|  | Drying property | Excellent | Excellent | Excellent | Excellent | Excellent |
|  | Print sharpness II Glossy | Excellent | Excellent | Excellent | Good | Excellent |
|  | Matted | Excellent | Excellent | Excellent | Excellent | Good |

The results for Examples 19 to 23 in the Table show that when a silicone-based surfactant expressed by the Formula (1) and a silicone-based surfactant expressed by the Formula (2) are used in combination as the surfactants, good printing can be performed with stability on offset coated media of various surface states of a wide range from glossy to matted. Comparison of the Examples shows that the blending ratio (weight ratio) $S_1/S_2$ of the two silicone-based surfactants $S_1$ and $S_2$ is preferably $S_1/S_2$=6/4 to 4/6.

Example 24

A carbon black dispersion [Cabojet 300, manufactured by Cabot Corporation, carboxylic group modified, aqueous dispersion, 15 weight % of solids] was used as the pigment, and 1,3-dimethyl-2-imidazolidinone [molecular weight: 114.2, boiling point: 225.5° C.] was used as the polar aprotic solvent. As the surfactant, Surflon S-111N, manufactured by Seimi Chemical Co., Ltd. as a fluorine-based surfactant expressed by the Formula (3) was used.

An ethylene oxide adduct of sodium citrate with which the p in the Formula (4) is 6 and all of $M^1$ to $M^3$ are sodium was used as the ethylene oxide adduct of organic acid. As the binder resin, an alkali-soluble acrylic resin [NeoCryl B-817, manufactured by Avecia Limited, weight average molecular weight Mw: 23,000] was used, and as the basic substance for dissolving the binder resin in the inkjet ink, 2-amino-2-methyl-1-propanol was used. As the polyoxyethylene phenyl ether, the compound expressed by the Formula (5-1) was used, and as the polyoxyethylene alkyl phenyl ether, the compound expressed by the Formula (6-1) was used. As the acetylene glycols, Surfynol 420 [made up of a mixture of a plurality of components of the Formula (7) that differ in the values of s and t, with the average value of s+t being 1.3], manufactured by Air Products and Chemicals Inc., was used, and as the biocidal agent, Proxel XL-2, manufactured by Zeneca Co., Ltd. was used.

The respective components mentioned above were blended at the proportions given below in ion-exchanged water, and after mixing by stirring, the mixture was filtered using a membrane filter of 5 μm to manufacture the inkjet ink. The blending ratio (weight ratio) P/F of the polar aprotic solvent P and the fluorine-based surfactant (effective component in Surflon S-111N) F was 67.4/1.

| (Component) | (Parts by weight) |
|---|---|
| Carbon black dispersion | 15 |
| 1,3-dimethyl-2-imidazolidinone | 48.5 |
| S-111N | 2.4 |
| Binder resin | 1 |
| 2-amino-2-methyl-1-propanol | 0.1 |
| Ethylene oxide adduct of sodium citrate | 0.5 |
| $C_6H_5O(CH_2CH_2O)_6H$ | 0.5 |
| $C_8H_{17}C_6H_4O(CH_2CH_2O)_{25}H$ | 0.5 |
| Ethanol | 2 |
| Acetylene glycols | 1 |
| Biocidal agent | 0.2 |
| Ion-exchanged water | 28.3 |

Example 25

Except setting the amount of Surflon S-111N as the fluorine-based surfactant to 1.7 parts by weight, the blending ratio (weight ratio) P/F of the polar aprotic solvent P and the fluorine-based surfactant F to 95.1/1, and the amount of the ion-exchanged water to 29.0 parts by weight, an inkjet ink was manufactured in the same manner as in Example 24.

Example 26

Except setting the amount of Surflon S-111N as the fluorine-based surfactant to 1.5 parts by weight, the blending ratio (weight ratio) P/F of the polar aprotic solvent P and the fluorine-based surfactant F to 107.8/1, and the amount of the ion-exchanged water to 29.2 parts by weight, an inkjet ink was manufactured in the same manner as in Example 24.

Example 27

Except setting the amount of Surflon S-111N as the fluorine-based surfactant to 3.5 parts by weight, the blending ratio (weight ratio) P/F of the polar aprotic solvent P and the fluorine-based surfactant F to 46.2/1, and the amount of the ion-exchanged water to 27.2 parts by weight, an inkjet ink was manufactured in the same manner as in Example 24.

Example 28

Except setting the amount of Surflon S-111N as the fluorine-based surfactant to 3.8 parts by weight, the blending ratio (weight ratio) P/F of the polar aprotic solvent P and the fluorine-based surfactant F to 42.5/1, and the amount of the ion-exchanged water to 26.9 parts by weight, an inkjet ink was manufactured in the same manner as in Example 24.

The above-described discharge stability test I, drying test, and print sharpness test II were carried out on the inkjet inks manufactured in the respective Examples to evaluate the characteristics of the inks. The results are shown in Table 5.

TABLE 5

| | | Example | | | | |
|---|---|---|---|---|---|---|
| | | 24 | 25 | 26 | 27 | 28 |
| Polar aprotic solvent P | Molecular weight | 114.2 | 114.2 | 114.2 | 114.2 | 114.2 |
| | Content proportion (wt %) | 48.5 | 48.5 | 48.5 | 48.5 | 48.5 |
| | P/F | 67.4/1 | 95.1/1 | 107.8/1 | 46.2/1 | 42.5/1 |
| Characteristics | Discharge stability I | Excellent | Excellent | Excellent | Excellent | Good |
| | Drying property | Excellent | Excellent | Excellent | Excellent | Excellent |
| | Print sharpness II  Glossy | Excellent | Excellent | Good | Excellent | Excellent |
| | Print sharpness II  Matted | Excellent | Excellent | Excellent | Excellent | Excellent |

The results for Examples 24 to 28 in the Table show that when a fluorine-based surfactant expressed by the Formula (3) is used as the surfactant, good printing can be performed with stability on offset coated media of various surface states of a wide range from glossy to matted. Comparison of the Examples shows that the blending ratio (weight ratio) P/F of the polar aprotic solvent P and the fluorine-based surfactant F is preferably such that P/F=45/1 to 100/1.

Example 29

Except using the same amount of Johncryl 682 (weight average molecular weight Mw: 1,700), manufactured by Johnson Polymer Corporation, as the binder resin, an inkjet ink was manufactured in the same manner as in Example 24.

Example 30

Except using the same amount of Johncryl 586 (weight average molecular weight Mw: 4,600), manufactured by Johnson Polymer Corporation, as the binder resin, an inkjet ink was manufactured in the same manner as in Example 24.

The above-described discharge stability test I, drying test, print sharpness test II, and the following test were carried out on the inkjet inks manufactured in the respective Examples to evaluate the characteristics of the inks.

<<Discharge Stability Test II>>

Each of the inkjet inks of the Examples and Comparative Examples was filled into an empty black ink cartridge [Part No. 51645A, manufactured by Hewlett-Packard Development Company, L.P.] for a thermal jet type inkjet ink printer [Desk Jet 6127, manufactured by Hewlett-Packard Development Company, L.P.], and printing was performed. Then after leaving the printer in a state in which the head is not returned to the home position and the nozzles are uncapped for 5 minutes, solid printing of 1 cm×1 cm was performed on a commercially available glossy paper. The print was then observed, and the discharge stability of the inkjet ink was evaluated according to the following standards.

Excellent: No faints were seen at all in the solid print. The discharge stability after restarting of printing was evaluated extremely good.

Good: Although faints were seen slightly at initial portions of the solid print, solid printing without faints was performed thereafter. The discharge stability after restarting of printing was evaluated as reaching a practical level.

Poor: Faints were seen across the entire solid print. The discharge stability after restarting of printing was evaluated poor.

The results of the above are shown in Table 6.

TABLE 6

| | | Example | |
|---|---|---|---|
| | | 29 | 30 |
| Polar aprotic solvent P | Molecular weight | 114.2 | 114.2 |
| | Content proportion (wt %) | 48.5 | 48.5 |
| | P/F | 67.4/1 | 67.4/1 |
| | Molecular weight Mw of the binder resin | 1,700 | 4,600 |
| Characteristics | Discharge stability I | Excellent | Excellent |
| | Discharge stability II | Excellent | Good |
| | Drying property | Excellent | Excellent |
| | Print sharpness II  Glossy | Excellent | Excellent |
| | Print sharpness II  Matted | Excellent | Excellent |

The results for Examples 29 and 30 in the Table show that, in an inkjet ink used in an inkjet printer of a type with which the operation of returning the head to the home position is performed manually, the use of a binder resin with a weight average molecular weight Mw of 1,000 to 3,000 is preferable for preventing faints and other print defects.

What is claimed is:

1. An inkjet ink, comprising:
   a pigment;
   water;
   a surfactant; and
   from 40 to 75 weight % of a polar aprotic solvent having a molecular weight of 40 to 130,
   wherein the surfactant is, in combination, (a) a silicone-based surfactant $S_1$ expressed by Formula (1):

[Chemical Formula 1]

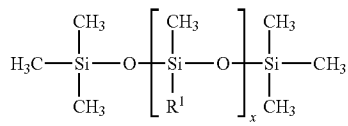

(1)

where $R^1$ indicates a polyalkylene oxide chain containing at least one ethylene oxide group or propylene oxide group, and x indicates a numeral of no less than 1 and
(b) a silicone-based surfactant $S_2$ expressed by the Formula (2):

[Chemical Formula 2]

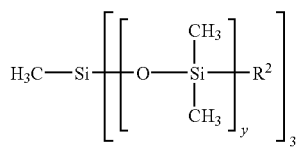

(2)

where $R^2$ indicates a polyalkylene oxide chain containing at least one ethylene oxide group or propylene oxide group, and y indicates a numeral of no less than 1, and wherein the two silicone-based surfactants $S_1$ and $S_2$ have a blending ratio (weight ratio) $S_1/S_2$ that ranges from 6/4 to 4/6.

2. A printing method, comprising the steps of: providing the inkjet ink of claim 1 to print on a hydrophobic medium; and heating the hydrophobic medium after printing.

3. The inkjet ink according to claim 1, wherein the polar aprotic solvent P and the two silicone-based surfactants, $S_1+S_2$, have a blending ratio $P/(S_1+S_2)$ that ranges from 45/1 to 70/1.

4. A printing method, comprising the steps of:
providing the inkjet ink of claim 3 to print on a hydrophobic medium; and
heating the hydrophobic medium after printing.

* * * * *